(12) United States Patent
Minkin

(10) Patent No.: US 10,273,087 B2
(45) Date of Patent: Apr. 30, 2019

(54) CONVEYOR BELT HAVING TRANSVERSE STRIP REGIONS AND CHEVRON PROFILING REGIONS

(71) Applicant: ContiTech Transportbandsysteme GmbH, Hannover (DE)

(72) Inventor: Andrey Minkin, Göttingen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/525,593

(22) PCT Filed: Sep. 29, 2015

(86) PCT No.: PCT/EP2015/072322
§ 371 (c)(1),
(2) Date: May 10, 2017

(87) PCT Pub. No.: WO2016/082991
PCT Pub. Date: Jun. 2, 2016

(65) Prior Publication Data
US 2017/0327316 A1 Nov. 16, 2017

(30) Foreign Application Priority Data
Nov. 27, 2014 (DE) .......................... 10 2014 224 291

(51) Int. Cl.
*B65G 15/42* (2006.01)
*B65G 15/40* (2006.01)

(52) U.S. Cl.
CPC ............ *B65G 15/42* (2013.01); *B65G 15/40* (2013.01); *B65G 2201/045* (2013.01); *B65G 2812/02227* (2013.01)

(58) Field of Classification Search
CPC ......... B65G 15/40; B65G 15/42; B65G 15/44
USPC ....................................................... 198/819
See application file for complete search history.

(56) References Cited

U.S. PATENT DOCUMENTS

| | | | | |
|---|---|---|---|---|
| 810,510 A * | 1/1906 | Robins, Jr. | ............. | B65G 15/08 198/690.2 |
| 874,982 A * | 12/1907 | Norton | .................... | B65G 15/42 198/690.2 |
| 2,977,266 A * | 3/1961 | Sedgley | ................. | B65G 15/42 198/692 |
| 3,603,447 A * | 9/1971 | Pott | ........................ | B65G 15/42 198/711 |
| 3,750,864 A * | 8/1973 | Nolte | ..................... | B65G 15/42 198/707 |

(Continued)

FOREIGN PATENT DOCUMENTS

| | | |
|---|---|---|
| CN | 103010663 A | 4/2013 |
| DE | 836620 C | 4/1952 |

(Continued)

*Primary Examiner* — Joseph A Dillon, Jr.
(74) *Attorney, Agent, or Firm* — David L. Cate

(57) ABSTRACT

A conveyor belt, in particular a tubular conveyor belt or a pipe conveyor belt or a pouch conveyor belt, which has a belt body that has a carrying-side cover sheet, a profiling that is formed substantially perpendicular to the surface of the carrying-side cover sheet being formed on the carrying-side cover sheet, the profiling having a number of transverse-strip profiling regions along a longitudinal direction of the carrying-side cover sheet.

11 Claims, 5 Drawing Sheets

(56) References Cited

U.S. PATENT DOCUMENTS

Figure 1:
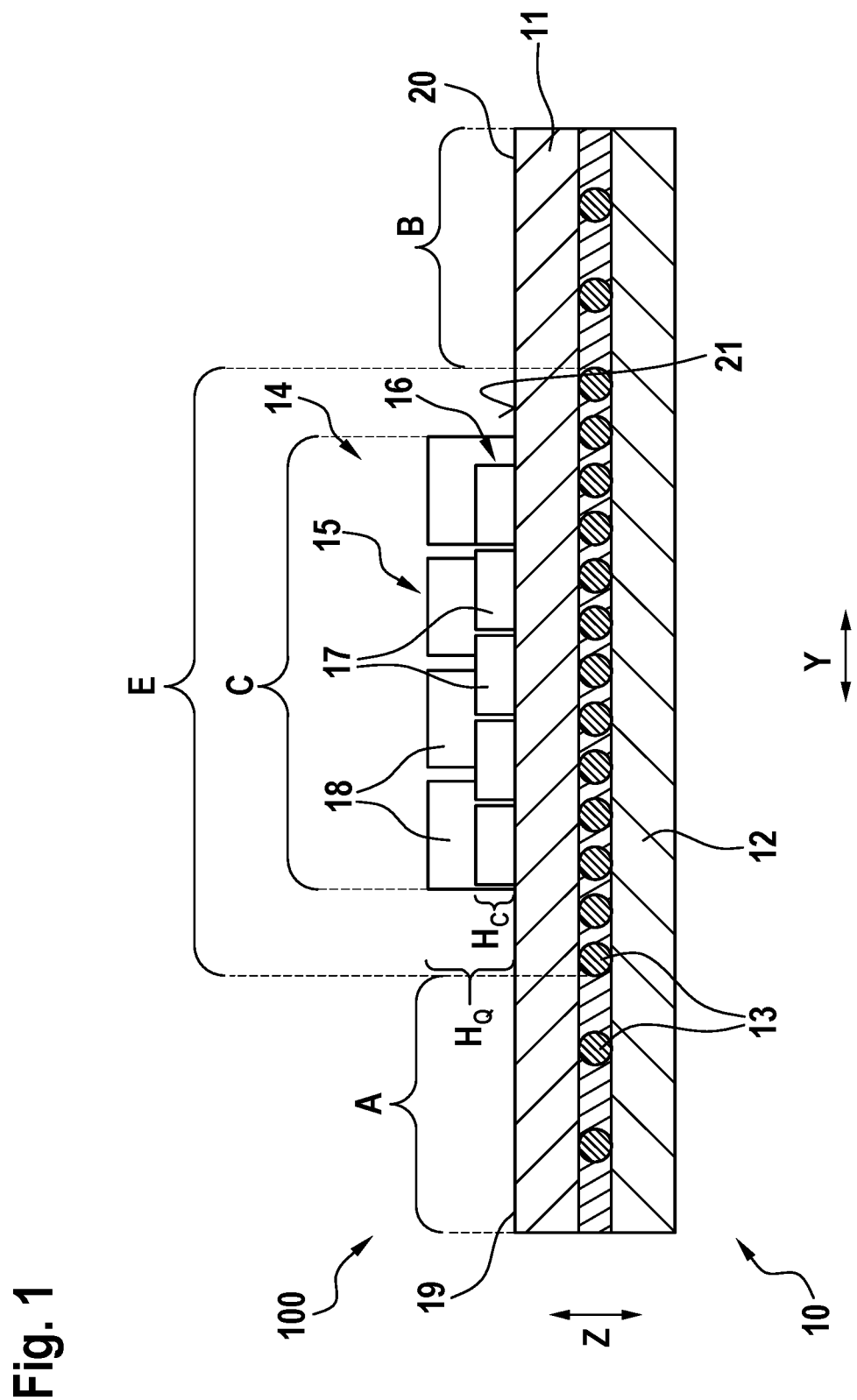

| | | | | |
|---|---|---|---|---|
| 3,756,382 A * | 9/1973 | Adey, Jr. | | B65G 15/42 198/690.2 |
| 4,449,958 A * | 5/1984 | Conrad | | B65G 15/42 198/834 |
| 4,532,098 A * | 7/1985 | Campbell | | B29D 29/06 156/137 |
| 4,747,747 A * | 5/1988 | Fusco | | B60P 1/365 198/834 |
| 6,371,280 B1 * | 4/2002 | Lindner | | A01F 15/18 198/690.2 |
| 6,837,366 B2 * | 1/2005 | Nishikita | | B65G 15/36 198/847 |
| 7,261,203 B2 * | 8/2007 | Mindich | | B29C 55/04 198/819 |
| 9,463,930 B2 * | 10/2016 | Minkin | | B65G 15/40 |
| 9,517,886 B2 * | 12/2016 | Petersen | | B65G 15/42 |
| 2002/0175055 A1 * | 11/2002 | Ryde | | B65G 15/34 198/847 |
| 2009/0114101 A1 * | 5/2009 | Keese | | A47J 36/02 99/386 |
| 2009/0194470 A1 * | 8/2009 | Hendrickson | | B07B 13/003 209/691 |
| 2012/0000751 A1 * | 1/2012 | Boursier | | B65G 15/08 198/818 |
| 2012/0285801 A1 * | 11/2012 | Neufeld | | B65G 15/42 198/690.2 |
| 2013/0168209 A1 | 7/2013 | Fanshier et al. | | |
| 2014/0262697 A1 * | 9/2014 | Franzoni | | B65G 15/48 198/848 |
| 2016/0031650 A1 * | 2/2016 | Petersen | | B65G 15/42 198/699.1 |
| 2016/0039609 A1 * | 2/2016 | Lurie | | B65G 23/14 198/819 |
| 2016/0060040 A1 | 3/2016 | Minkin | | |
| 2016/0159573 A1 * | 6/2016 | Miller | | B65G 15/58 198/311 |
| 2017/0094899 A1 * | 4/2017 | Webermann | | A01D 57/20 |
| 2017/0334651 A1 * | 11/2017 | Miller | | B65G 15/58 |
| 2017/0355527 A1 * | 12/2017 | Kaeb | | B65G 15/42 |

FOREIGN PATENT DOCUMENTS

| | | |
|---|---|---|
| JP | S4848385 U | 6/1973 |
| JP | S5883314 U | 6/1983 |
| JP | S6274709 A | 4/1987 |
| JP | S6274608 U | 5/1987 |
| JP | S6274609 U | 5/1987 |
| WO | 2005085101 A1 | 9/2005 |
| WO | 2014180585 A1 | 11/2014 |

* cited by examiner

CONVEYOR BELT HAVING TRANSVERSE STRIP REGIONS AND CHEVRON PROFILING REGIONS

The invention relates to a conveyor belt, in particular a tubular conveyor belt or a pipe conveyor belt or a pouch conveyor belt, which has a belt body that has a carrying-side cover sheet, a profiling that is formed substantially perpendicular to the surface of the carrying-side cover sheet being formed on the carrying-side cover sheet, the profiling having a number of transverse-strip profiling regions along a longitudinal direction of the carrying-side cover sheet.

In the technology of conveying loose materials to be conveyed, such as bulk materials, for example rock, mineral resources, excavated material, agricultural products, etc., usually conveyor belts that are formed in a trough-shaped manner are used, receiving the material to be conveyed on their carrying-side cover sheet at a receiving point and discharging it again at a discharging point. Since the material being conveyed is not usually covered with respect to the surroundings while it is being transported on the conveyor belt formed in a trough-shaped manner, the material being conveyed can be exposed to contaminants and weathering effects of the surroundings and, depending on the type of material to be transported, the material being conveyed may also pollute or even be hazardous to the surroundings. Also, because of their structural design, curves and gradients can only be realized to a restricted extent with conveyor belts formed in a trough-shaped manner. For instance, in the case of conventional conveyor belt installations, an angle of inclination of 20° gradient generally cannot be exceeded. If the limit of feasibility is reached, a number of conveyor belts, sometimes special conveyor belts, with transfer points must be combined. This increases the complexity, and consequently the costs, of the conveyor belt installation significantly.

In order to avoid this, conveyor belts that operate in a closed form, such as for example tubular conveyor belts or pouch conveyor belts, were developed. Tubular conveyor belts are rolled together between a receiving point and a discharging point to form a closed tube or pipe, in that the outer peripheral zones formed along the longitudinal side edges of the conveyor belt, also known as belt flanks, overlap, and consequently the material being conveyed can be completely enclosed during transport. This makes it possible to separate the material being conveyed in the tubular conveyor belt completely from the surroundings, since the tubular conveyor belt remains closed over the conveying distance. In the region of the receiving point and discharging point of the material being conveyed, the peripheral zones of the conveyor belt are no longer arranged in an overlapping manner, but instead the tubular conveyor belt has the form of a conventional troughed conveyor belt. Consequently, in the case of such a tubular conveyor belt, contaminants in the material being conveyed along the conveying distance, and associated environmental pollution, can be avoided to the greatest extent. Further essential advantages of the tubular conveyor belts in comparison with the conventional troughed conveyor belts lie in the possibility of realizing very tight three-dimensional curves and in the achievement of relatively high angles of inclination of up to 35° gradient, whereby the implementation of complicated three-dimensional curved linear routes is possible with a single conveyor belt installation.

A pouch conveyor belt has two fabric-reinforced profiles, each with a vulcanized-in steel cable as a tension member. The profiles run over sets of rollers and carry a pouch, which receives the material to be conveyed and is formed by the belt body of the conveyor belt. The pouch, shaped in the form of a drop, or the belt body, shaped in the form of a drop, is formed from a highly flexible rubber and is connected to the profiles by means of hot vulcanization. The profiles are arranged one over the other during the transport of the conveyor belt, with the result that the conveyor belt is sealed in a dust-tight manner. In a way similar to in the case of tubular conveyor belts, the essential advantages of the pouch conveyor belts in comparison with the conventionally troughed conveyor belts lie in the possibility of realizing very tight three-dimensional curves and in the relatively high angles of inclination of up to 35° gradient.

In order to increase further the angle of inclination of such conveyor belts, in particular of tubular conveyor belts and/or pouch conveyor belts, it is known to provide a profiling on a carrying-side cover sheet of the belt body on which the material being conveyed lies during transport, transverse-strip profilings being particularly suitable for this, these profilings being arranged transversely to the longitudinal direction or transversely to the conveying direction of the conveyer belt on the carrying-side cover sheet. The arrangement of such transverse-strip profilings allows angles of inclination of the conveyor belt of up to 60° gradient to be achieved. Such a transverse-strip profiling is known for example from WO 2005/085101 A1.

However, the arrangement of transverse-strip profilings on the carrying-side cover sheet is very complex and expensive. For instance, because of their size, in particular in the radial direction of the tubular or pouch conveyor belt, the web elements forming the transverse-strip profilings must be produced as separate elements and be applied subsequently to the belt body of the conveyor belt, for example by means of adhesive attachment, that is to say by cold vulcanization. This requires separate production of the web elements and their subsequent mounting on the conveyor belt as a further work step. Because of the size of the web elements, it is not possible for technical production-related reasons for the web elements to be formed in one piece with the belt body. For instance, it may be required that the web elements are only mounted on the belt body at the place of use of the conveyor belt, in order not to increase the volume of the conveyor belt for transport.

The invention is therefore based on the object of providing a conveyor belt by means of which an angle of inclination of up to 60° gradient can be realized and at the same time the production complexity, the production time and the production costs of the conveyor belt can be reduced.

The object is achieved according to the invention by a conveyor belt as claimed in claim 1. Advantageous developments of the invention are described in the subclaims.

The conveyor belt according to the invention is distinguished by the fact that the profiling of the conveyor belt has in addition to the transverse-strip profiling regions a number of chevron profiling regions along the longitudinal direction of the carrying-side cover sheet.

The transverse-strip profiling regions make it possible to form positively engaging transport of the material being conveyed on the carrying-side cover sheet of the conveyor belt, it being possible to achieve an angle of inclination of the conveyor belt of up to 60° gradient. The fact that now chevron profiling regions are formed on the carrying-side cover sheet of the belt body in addition to the transverse-strip profiling regions means that non-positively engaging transport of the material being conveyed is possible in addition to the positively engaging transport of the material being conveyed. The chevron profiling regions allow the wall friction value between the material being conveyed and the conveyor belt to be increased, whereby, together with the internal friction value of the material being conveyed, non-positively engaging transport of the material being conveyed can be achieved. If the chevron profiling regions are arranged between transverse-strip profiling regions, a force transmission is possible from the conveyor belt to the material being conveyed between the transverse-strip profiling regions, whereby slipping of the material being conveyed counter to the conveying direction on the carrying-side cover sheet of the belt body of the conveyor belt can be prevented. The additional force transmission to the material being conveyed by means of the chevron profiling regions makes it possible to form the spacing in the longitudinal direction of the carrying-side cover sheet between the transverse-strip profiling regions on the carrying-side cover sheet of the belt body greater than is otherwise usual, since the chevron profiling regions between the transverse-strip profiling regions now also make non-positively engaging transport of the material being conveyed possible in addition to the positively engaging transport of the material being conveyed. In spite of a greater spacing of the transverse-strip profiling regions from one another, slipping back of the material being conveyed during transport, and in particular when there are angles of inclination of the conveyor belt of up to 60° gradient, can be reliably prevented as a result. The possible increase in the spacing of the transverse-strip profiling regions along the longitudinal direction of the conveyor belt or the carrying-side cover sheet of the belt body allows the number of transverse-strip profiling regions to be arranged on the carrying-side cover sheet to be reduced, whereby the production costs, the production complexity and also the production time of the arrangement of the transverse-strip profiling regions on the carrying-side cover sheet of the belt body of the conveyor belt are reduced, whereby the overall production of the conveyor belt can be simplified and can be performed with reduced costs. The formation of these two different types of profilings on a belt body allows both the transport of the material being conveyed on the conveyor belt to be improved and the complexity, time and costs in the production of the conveyor belt to be reduced.

It may preferably be provided that the chevron profiling regions and the transverse-strip profiling regions are arranged in an alternating manner in the longitudinal direction of the carrying-side cover sheet. With an alternating arrangement, a chevron profiling region is followed by a transverse-strip profiling region and a transverse-strip profiling region is followed again by a chevron profiling region, and so on. The alternating arrangement of chevron profiling regions and transverse-strip profiling regions makes a particularly good distribution of positively engaging and non-positively engaging transport of the material being conveyed along the longitudinal direction of the carrying-side cover sheet possible, in order to be able to perform the transport of the material being conveyed reliably and cost-effectively even when there is a greater spacing of the transverse-strip profiling regions in relation to one another, in particular when there are angles of inclination of the conveyor belt of up to 60°.

The arrangement of chevron profiling regions between transverse-strip profiling regions makes it possible to increase the spacing between the individual transverse-strip profiling regions along the longitudinal direction of the carrying-side cover sheet of the belt body. In this case, it may be advantageously provided that the transverse-strip profiling regions are arranged at a spacing L of $1.5\ m \leq L \leq 2.5\ m$, in particular of $1.8\ m \leq L \leq 2.2\ m$, in relation to one another. The spacing between two transverse-strip profiling regions can consequently be increased significantly in comparison with conventional conveyor belts, which exclusively have transverse-strip profiling regions as profiling, whereby the production of the conveyor belts can be improved significantly with respect to complexity, time and costs in comparison with conventional conveyor belts with exclusively transverse-strip profiling regions.

The chevron profiling regions and/or the transverse-strip profiling regions may extend in each case over the width of the carrying-side cover sheet from a first peripheral zone, formed along a first longitudinal side edge of the carrying-side cover sheet, to a second peripheral zone, formed along a second longitudinal side edge of the carrying-side cover sheet that is opposite the first longitudinal side edge. The extent of the profilings, in particular the chevron profiling regions and the transverse-strip profiling regions, over substantially the entire width of the carrying-side cover sheet allows the greatest possible amount of material being conveyed to be kept reliably in its position during transport on the conveyor belt by way of the profiling. Both positive and non-positive transmission between the conveyor belt and the material being conveyed is consequently possible over the entire width of the carrying-side cover sheet, and consequently of the belt body, on which the material to be transported lies. The cutting out of the peripheral zones along the longitudinal side edges of the carrying-side cover sheet with the profiling makes it possible that an overlapping of the belt body in the region of the peripheral zones is not hindered by profilings when the conveyor belt is formed as a tubular conveyor belt or pouch conveyor belt.

At least one of the number of transverse-strip profiling regions may for example have a web element in a wave edge form. The web element then preferably takes the form of a strip formed in a wave-shaped manner, which may extend over a partial region of the width of the carrying-side cover sheet or over the entire width of the carrying-side cover sheet up to the peripheral zones. If the web element only extends in its length over a partial region of the width, it is also possible for a number of web elements, preferably a number of web elements in a wave edge form, to be arranged over the width of the carrying-side cover sheet spaced apart from one another in a row. The wave form of the web element of the transverse-strip profiling region allows a particularly stable separating wall to be formed on the carrying-side cover sheet of the belt body. The wave form or wave edge form increases the stability of the transverse-strip profiling region, whereby a deformation, for example a buckling, of the transverse-strip profiling regions by the material to be transported can be prevented. If the web element having the wave edge form is formed with such a length that it can extend over the entire width of the carrying-side cover sheet up to the peripheral zones, the web element, and consequently this transverse-strip profiling region, can be arranged and fastened in one piece on the carrying-side cover sheet of the belt body, whereby the assembly time and also the assembly complexity can be reduced significantly in comparison with transverse-strip profiling regions formed by a number of individual elements, in particular individual web elements, which have to be fastened individually. Moreover, a web element formed in a wave edge form can easily be deformed during a rolling together of the belt body to form a tubular conveyor belt or pipe conveyor belt, which is more difficult in the case of web elements formed in some other way.

It is however also possible that at least one of the transverse-strip profiling regions has in each case a number of web elements arranged one behind the other in a row in the transverse direction of the carrying-side cover sheet that are spaced apart from one another in such a way that, when the conveyor belt is deformed in the form of a tube or in the form of a pouch, the web elements arranged alongside one another lie against one another or overlap, at least in certain regions. If the transverse-strip profiling regions are formed by web elements arranged one behind the other in a row, the web elements lying against one another or overlapping thus form along their length or longitudinal alignment a separating wall over the width of the carrying-side cover sheet up to the peripheral zones. The web elements preferably have a planar, rectilinear surface extent over their length.

Furthermore, it is also possible that a transverse-strip profiling region has web elements with a planar, rectilinear surface extent in their length and web elements in a wave edge form arranged in the transverse direction of the carrying-side cover sheet.

The chevron profiling regions may preferably have in each case a number of web elements arranged diagonally in relation to the longitudinal direction of the carrying-side cover sheet and arranged in groups, each group of web elements forming a V shape with a tip formed by two mutually adjacent web elements, the tip being aligned counter to a conveying direction of the conveyor belt. The material being conveyed can support itself in the V shape of the group of web elements of the chevron profiling regions, and in particular in the tip of this V shape, allowing a frictional effect to be achieved, whereby the material being conveyed can be kept reliably in its position even when there are relatively great gradients, and consequently relatively great angles of inclination, of the conveyor belt. The web elements forming the V shape may be arranged spaced apart from one another, or web elements that are arranged alongside one another may be directly adjacent to one another in order to form a closed V shape. Other arrangements of the web elements that do not form a V shape are likewise possible. Furthermore, it is also possible that, as an alternative or in addition to the diagonally arranged web elements, the chevron profiling regions have web elements that extend in the longitudinal direction and/or the transverse direction of the carrying-side cover sheet.

The chevron profiling regions may have in each case in the transverse direction of the carrying-side cover sheet two or more groups of web elements arranged in a V-shaped manner. If the chevron profiling region has a number of groups of web elements arranged in a V-shaped manner over the width of the belt body or the carrying-side cover sheet of the belt body, the number of tips formed in a V-shaped manner can be increased, whereby the support of the material to be transported on the carrying-side cover sheet of the belt body can be improved. The groups of a chevron profiling region are in this case arranged one behind the other in the transverse direction of the carrying-side cover sheet. The arrangement of two or more groups along the transverse direction or width of the belt body consequently also allows the friction effect that is achieved by means of the chevron profiling regions between the conveyor belt and the material being conveyed to be improved, and consequently increased, in order to be able to improve the transport of the material being conveyed.

In order to provide the V-shaped tip of the chevron profiling regions with greater stability, it may preferably be provided that there is arranged at the tip a web element extending in the longitudinal direction of the carrying-side cover sheet that preferably extends away from the tip counter to the conveying direction of the conveyor belt. In particular if the material to be transported is lying in the tip of the V shape and pressing on it, a great force acts as a result on the tip of the V shape, whereby the latter may be undesirably deformed, with the result that adequate support of the material being conveyed could no longer be ensured. This can be prevented by the arrangement at the tip of an additional web element in the longitudinal direction of the carrying-side cover sheet counter to the conveying direction of the conveyor belt, since the stability of the tip of the V shape can thereby be increased significantly.

The transverse-strip profiling regions preferably have a height $H_Q$, extending in a perpendicular direction in relation to the surface of the carrying-side cover sheet, that is preferably greater than a height $H_C$, extending in a perpendicular direction in relation to the surface of the carrying-side cover sheet, of the chevron profiling regions. The greater height of the transverse-strip profiling regions as compared to the chevron profiling regions means that the transverse-strip profiling regions project beyond the chevron profiling regions, with the result that the transverse-strip profiling regions can in each case form a separating wall between the individual chevron profiling regions.

In this case, a ratio of the height of the transverse-strip profiling regions to the height of the chevron profiling regions of $3 \leq H_Q/H_C \leq 10$ is preferably formed. The chevron profiling regions preferably have a height of 10-50 mm. The transverse-strip profiling regions may preferably have a height of up to 250 mm.

The chevron profiling regions, and in particular the individual elements or web elements of the chevron profiling regions, may have a relatively small height, with the result that they can be formed at the same time during the production of the conveyor belt, and consequently during the vulcanization of the carrying-side cover sheet of the belt body. Consequently, the chevron profiling regions may preferably be formed in one piece with the carrying-side cover sheet. This makes it possible to avoid an additional production or assembly step for the arrangement and fastening of the chevron profiling regions or the individual web elements of the chevron profiling regions on the carrying-side cover sheet of the main body. This allows the production time and also the production costs of the entire conveyor belt to be reduced. Moreover, the one-piece formation of the chevron profiling regions with the carrying-side cover sheet means that a particularly solid connection is possible between the chevron profiling regions or the web elements of the chevron profiling regions and the carrying-side cover sheet of the belt body.

The chevron profiling regions, and in particular the individual elements or web elements of the chevron profiling regions, may however also be arranged subsequently on the carrying-side cover sheet of the belt body, for example by being vulcanized on or adhesively attached.

The transverse-strip profiling regions are preferably fastened on the carrying-side cover sheet by being vulcanized on. The transverse-strip profiling regions or the web elements of the transverse-strip profiling regions are consequently fastened on the carrying-side cover sheet of the belt body in an additional production step or assembly step. As an alternative to being vulcanized on, the transverse-strip profiling regions may also be fastened on the carrying-side cover sheet for example by being adhesively attached.

Figure 2:
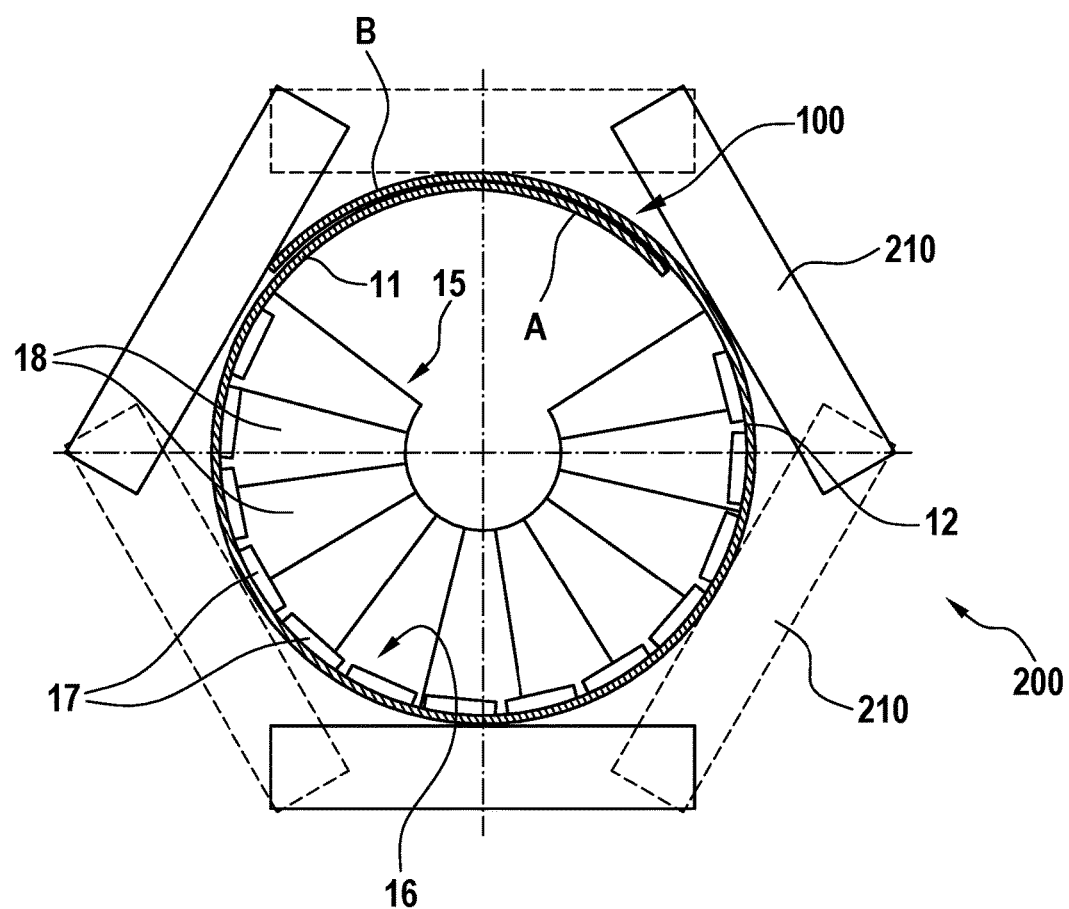
Figure 3:
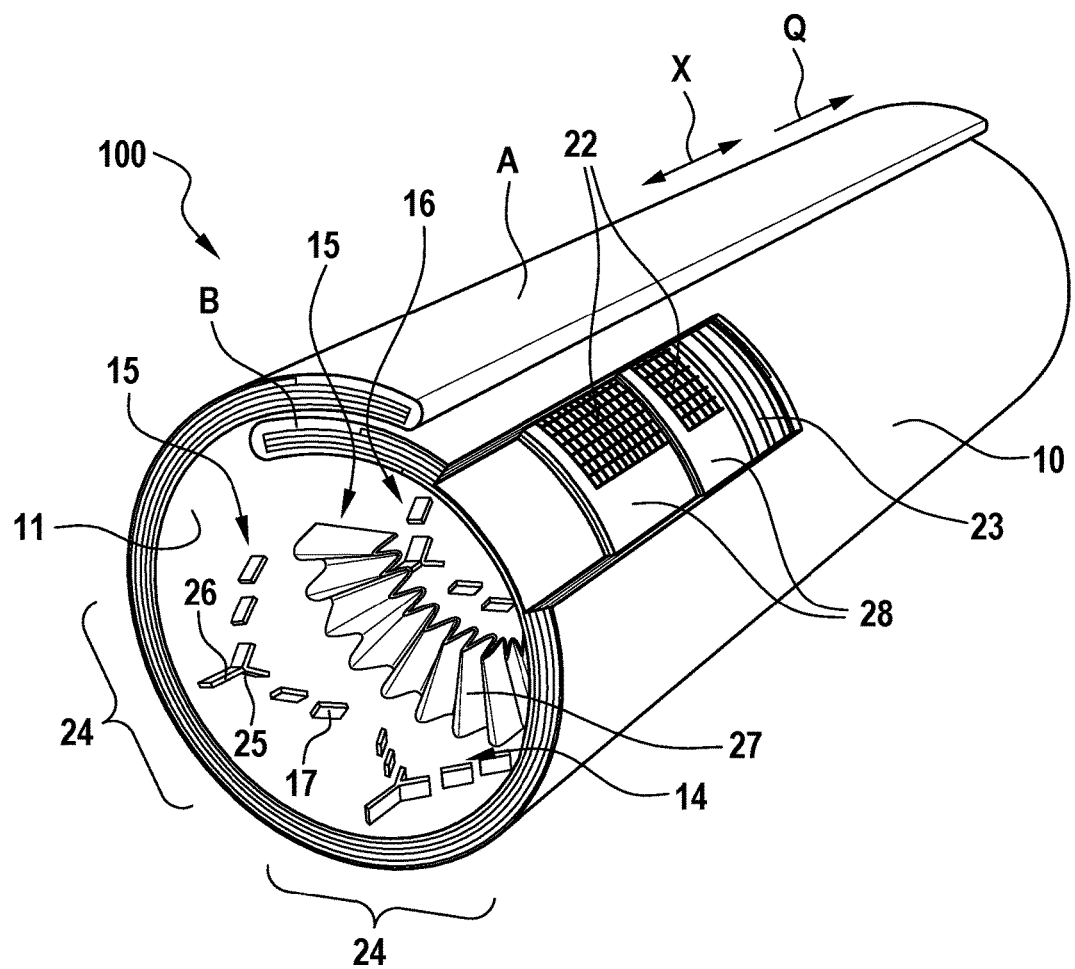
Figure 4:
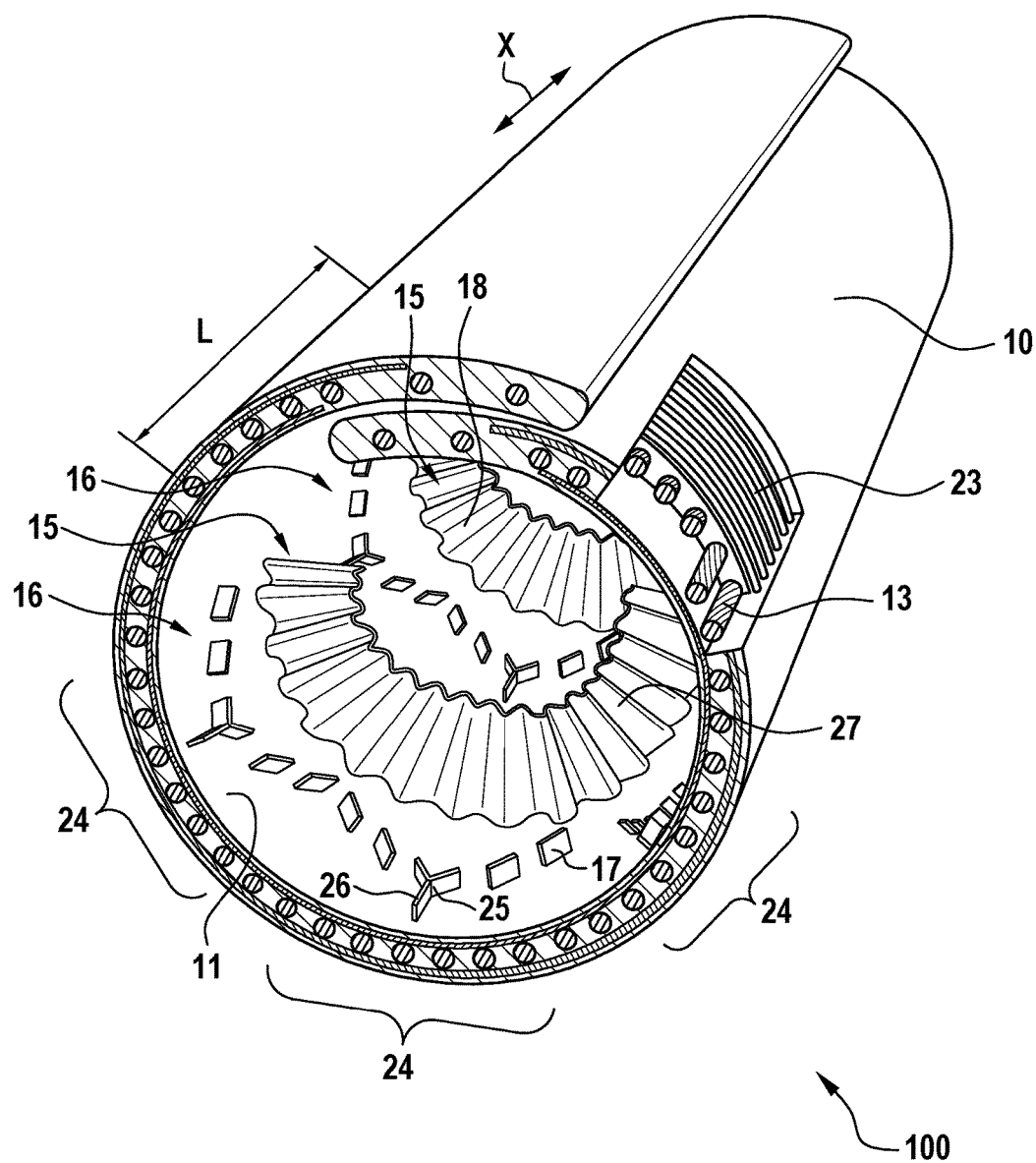
Figure 5:
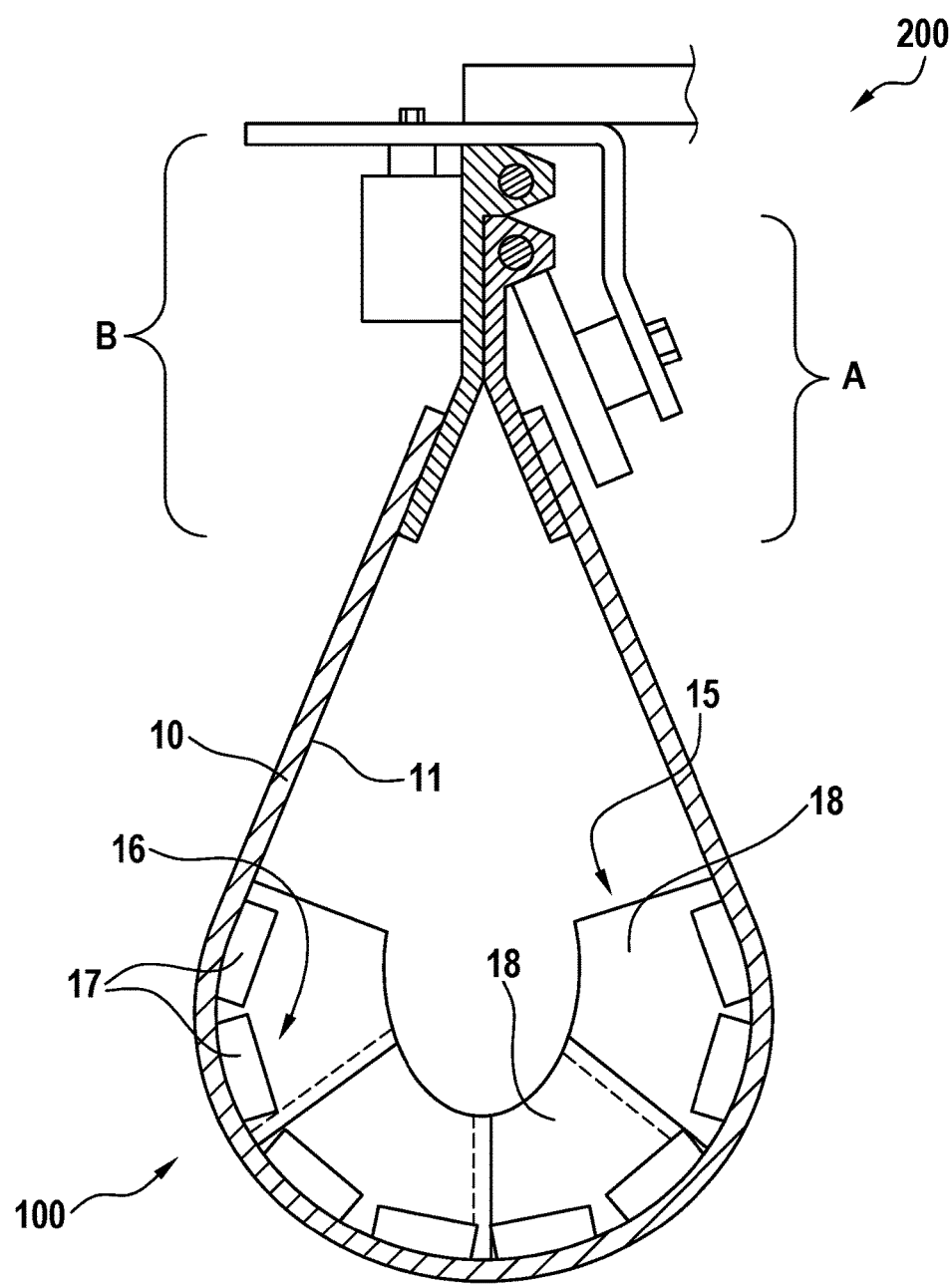

The invention is explained in more detail below on the basis of preferred exemplary embodiments with reference to the accompanying drawings. In the figures:

FIG. 1 shows a schematic sectional representation of a conveyor belt according to the invention, FIG. 2 shows a schematic sectional representation through a carrying roller station of a conveyor belt according to the invention formed as a tubular conveyor belt, FIG. 3 shows a schematic perspective sectional representation of a conveyor belt according to the invention formed as a tubular conveyor belt, FIG. 4 shows a further schematic perspective sectional representation through a conveyor belt according to the invention formed as a tubular conveyor belt, and FIG. 5 shows a schematic representation of a section through a conveyor belt according to the invention formed as a pouch conveyor belt.

FIG. 1 shows a schematic sectional representation through a conveyor belt 100 along a transverse direction Y of the conveyor belt 100. The conveyor belt 100 has a belt body 10, which has a carrying-side cover sheet 11 and a running-side cover sheet 12, opposite from the carrying-side cover sheet. The material to be transported, not shown here, lies on the carrying-side cover sheet 11. Carrying rollers 210 for conveying the conveyor belt 100 in the conveying direction Q lie against the running-side cover sheet 12, as shown for example in FIG. 2.

Arranged between the carrying-side cover sheet 11 and the running-side cover sheet 12 are a multiplicity of tension members 13, which can absorb tensile forces of the conveyor belt 100. In the case of the configuration shown here, the number of tension members 13 in this case decreases from the middle (zone E) of the belt body 10 to the belt edges (peripheral zones A, B) of the conveyor belt 100 or the belt body 10. Steel cables may be used for example as tension members 13.

A profiling 14 is formed on the carrying-side cover sheet 11, the profiling 14 having transverse-strip profiling regions 15 and chevron profiling regions 16. The transverse-strip profiling regions 15 have a height $H_Q$, which is greater than the height $H_C$ of the chevron profiling regions 16. The sectional representation in FIG. 1 reveals a transverse-strip profiling region 15 and a chevron profiling region 16 arranged in front of it. The chevron profiling region 16 shown in FIG. 1 has a number of individual web elements 17, which may take the form of so-called oblique-protuberance or herringbone patterning. The transverse-strip profiling region 15 shown in FIG. 1 also has a number of individual web elements 18. The chevron profiling regions 16 and the transverse-strip profiling regions 15 extend over the width of the region C of the carrying-side cover sheet 11 of the belt body 10 within the zone E. The chevron profiling regions 16 and the transverse-strip profiling regions 15 extend in a perpendicular direction Z away from the surface 21 of the carrying-side cover sheet 11. The width of the profiling region C is generally half to two thirds of the entire belt width. Consequently, the profiling region C is much smaller than the zone E.

In FIG. 2, the conveyor belt 100 takes the form of a tubular conveyor belt, in that the peripheral zones A, B of the belt body 10 are arranged overlapping. As shown in FIG. 2, the conveyor belt 100 is arranged here in a carrying roller station 200, which has a multiplicity of carrying rollers 210 arranged distributed over the circumference of the conveyor belt 100.

In FIG. 2 it can also be seen that, with the conveyor belt 100 formed as a tubular conveyor belt, the transverse-strip profiling regions 15 fill at least half, preferably two thirds, of the cross-sectional area of the conveyor belt 100 formed in a tubular manner. Not only the transverse-strip profiling region 15 that can be seen in FIG. 2 has a number of individual web elements 18 but also the chevron profiling region 16 that can be seen in FIG. 2 has a number of individual web elements 17. The tubular shaping of the conveyor belt 100 means that the individual web elements 18 arranged alongside one another of the transverse-strip profiling region 15 lie against one another or overlap, with the result that the transverse-strip profiling region 15 forms a closed separating wall over a large part of the width E of the carrying-side cover sheet 11.

FIG. 3 shows a perspective schematic sectional representation of a conveyor belt 100. It can be seen in this representation of a section that, to increase its transverse stiffness, the belt body 10 has a number of fabric plies 22, which act as tension members and are separated by thick rubber layers 28, and a reinforcement 23, which may for example be formed as a fabric reinforcement or a steel reinforcement. In a rolled-together form of the conveyor belt 100, such as that shown in FIG. 3, both the reinforcement 23 and the fabric plies 22 separated by thick rubber layers 28 can ensure the transverse stiffness of the conveyor belt 100 for a long period of time, whereby it is possible in particular to prevent the conveyor belt 100 from collapsing. Polyester, polyamide, cotton or aramid may be used for example for the fabric plies 22. Fabric cords or steel cords, which are arranged transversely to the longitudinal direction X in the belt body 10, may be used for example as the reinforcement 23.

In the representation in FIG. 3, a profiling 14 is likewise shown on the carrying-side cover sheet 11 of the belt body 10, the perspective representation revealing two chevron profiling regions 16 and one transverse-strip profiling region 15. The transverse-strip profiling region 15 shown in FIG. 3 has a web element 27, which extends continuously over a large part of the width E of the carrying-side cover sheet 11 and has a wave edge form.

The chevron profiling regions 16, which are arranged in front of and behind the transverse-strip profiling region 15 in the longitudinal direction X of the conveyor belt 100, have in each case a number of web elements 17 in the form of oblique protuberances arranged diagonally in relation to the longitudinal direction X of the carrying-side cover sheet 11 and arranged in groups 24, each group 24 of web elements 17 forming a V shape with a tip 25 formed by two mutually adjacent web elements 17, the tip being aligned counter to a conveying direction Q of the conveyor belt 100. Apart from the two web elements 17 forming the tip 25, the individual web elements 17 are arranged spaced apart from one another. Arranged at the tip 25 is an additional web element 26, which extends in the longitudinal direction X of the carrying-side cover sheet 11, this additional web element 26 extending away from the tip 25 counter to the conveying direction Q of the conveyor belt 100. The chevron profiling regions 16 that can be seen in FIG. 3 have in each case a number of groups 24 of web elements 17 arranged diagonally in relation to the longitudinal direction X of the carrying-side cover sheet 11.

FIG. 4 shows a representation of a conveyor belt 100 in which two transverse-strip profiling regions 15 and two chevron profiling regions 16 can be seen, these being arranged in an alternating manner, in that in the longitudinal direction X a chevron profiling region 16 is followed by a transverse-strip profiling region 15 and a transverse-strip profiling region 15 is followed again by a chevron profiling region 16, and the latter is again followed by a transverse-strip profiling region 15, this alternating arrangement of chevron profiling regions 16 and transverse-strip profiling regions 15 preferably extending over the entire length of the conveyor belt 100. The conveyor belt 100 shown in FIG. 4 differs substantially from the conveyor belt 100 shown in FIG. 3 in that, instead of the fabric plies 22 of the conveyor belt 100 shown in FIG. 3, in the case of the conveyor belt 100 shown in FIG. 4 tension members 13 in the form of steel cables running in the longitudinal direction X are arranged in the belt body 10.

FIG. 5 shows a conveyor belt 100, which is formed as a pouch conveyor belt. The conveyor belt 100 has formed-on profiles on its belt body 10, in particular at the peripheral zones A, B of the belt body 10, tension members being formed into the profiles in the longitudinal direction of the conveyor belt 100. The conveyor belt 100 is held and guided between carrying rollers of a carrying roller station 200. The belt body 10 of the conveyor belt 100 takes the form of a pouch, here too both transverse-strip profiling regions 15 and chevron profiling regions 16 being formed on the carrying-side cover sheet 11 of the belt body 10. As a result of the sectional representation, one of this number of transverse-strip profiling regions 15 and one of this number of chevron profiling regions 16 can be seen in FIG. 5, the transverse-strip profiling region 15 being formed by a number of web elements 18 lying against one another or overlapping and the chevron profiling region 16 being formed by a number of web elements 17 substantially arranged spaced apart from one another.

LIST OF DESIGNATIONS (Part of the Description)
A first peripheral zone with increased tension member interspacing
B second peripheral zone with increased tension member interspacing
E middle zone with normal tension member interspacing
C profiling region within the zone E
$H_Q$ height of the transverse-strip profiling region
$H_C$ height of the chevron profiling region
L spacing of the transverse-strip profiling regions from one another
Q conveying direction of the conveyor belt
Y transverse direction
X longitudinal direction
Z perpendicular direction
100 conveyor belt
10 belt body
11 carrying-side cover sheet
12 running-side cover sheet
13 tension member
14 profiling
15 transverse-strip profiling region
16 chevron profiling region
17 web element
18 web element
19 first longitudinal side edge
20 second longitudinal side edge
21 surface
22 fabric plies
23 reinforcement
24 group
25 tip
26 web element
27 web element
28 rubber layer
200 carrying roller station
210 carrying rollers

The invention claimed is:

1. A conveyor belt comprising a belt body having a carrying-side cover sheet for receiving material to be transported, a profiling that is formed substantially in a perpendicular direction (Z) in relation to a surface of the carrying-side cover sheet, the profiling being formed on the carrying-side cover sheet, and the profiling comprising a plurality of transverse-strip profiling regions along a longitudinal direction (X) of the carrying-side cover sheet, the longitudinal direction (X) being perpendicular to a transverse direction (Y) which is parallel to a width (E) of the carrying-side cover sheet;
   wherein the profiling further comprises a plurality of chevron profiling regions disposed along the longitudinal direction (X) of the carrying-side cover sheet;
   wherein the plurality of transverse-strip profiling regions is a plurality of web elements having wave edge forms; and,
   wherein each web element comprised in the plurality of web elements having wave edge forms extends continuously over a large part of the width (E) of the carrying-side cover sheet.

2. The conveyor belt as claimed in claim 1, wherein the plurality of transverse-strip profiling regions and the plurality of chevron profiling regions are arranged in an alternating manner in the longitudinal direction (X) of the carrying-side cover sheet.

3. The conveyor belt as claimed in claim 1, wherein the plurality of transverse-strip profiling regions are arranged at a spacing (L) of $1.5 \text{ m} \leq L \leq 2.5 \text{ m}$ in relation to one another.

4. The conveyor belt as claimed in claim 1, wherein the plurality of chevron profiling regions extend within a width (E) of the carrying-side cover sheet.

5. The conveyor belt as claimed in claim 1, wherein the plurality of chevron profiling regions comprise a plurality of second web elements arranged diagonally in relation to the longitudinal direction (X) of the carrying-side cover sheet, wherein the plurality of second web elements are arranged in groups, and wherein each group of the plurality of second web elements form a V shape with a tip formed by two mutually adjacent web elements, the tip being aligned counter to the conveying direction (Q) of the conveyor belt.

6. The conveyor belt as claimed in claim 5, wherein the plurality of chevron profiling regions has in each case two or more groups of second web elements arranged in a V-shaped manner.

7. The conveyor belt as claimed in claim 5, wherein there is arranged at a tip of the second web elements a third web element extending in the longitudinal direction (X) of the carrying-side cover sheet, and wherein the third web element extends away from the tip counter to the conveying direction (Q) of the conveyor belt.

8. The conveyor belt as claimed in claim 1, wherein the plurality of transverse-strip profiling regions have a height (HQ), extending in a perpendicular direction (Z) in relation to the surface of the carrying-side cover sheet, and wherein the height (HQ) is greater than a height (HC), extending in a perpendicular direction (Z) in relation to the surface of the carrying-side cover sheet, of the plurality of chevron profiling regions.

9. The conveyor belt as claimed in claim 8, wherein a ratio of the height (HQ) of the plurality of transverse-strip profiling regions to the height (HC) of the plurality of chevron profiling regions of $3 \leq HQ/HC \leq 10$ is formed.

10. The conveyor belt as claimed in claim 1, wherein the plurality of chevron profiling regions are formed in one piece with the carrying-side cover sheet.

11. The conveyor belt as claimed in claim 1, wherein the plurality of transverse-strip profiling regions are fastened to the carrying-side cover sheet by vulcanization.

* * * * *